United States Patent
Silva et al.

(10) Patent No.: US 11,839,182 B2
(45) Date of Patent: *Dec. 12, 2023

(54) METHODS OF PRODUCING SUGAR CANE TRANSPLANT UNITS

(71) Applicant: Syngenta Participations AG, Basel (CH)

(72) Inventors: Adilson Donizeti Correa Da Silva, Sao Paulo (BR); Amaral Leandro Irigon, Sao Paulo (BR); Fernando Beltrame, Sao Paulo (BR); Elmer Morais, Sao Paulo (BR); Victor Domiciano de Silos Labonia, Sao Paulo (BR); Daniel Bachner, Sao Paulo (BR)

(73) Assignee: SYNGENTA PARTICIPATIONS AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/982,183

(22) PCT Filed: Mar. 15, 2019

(86) PCT No.: PCT/US2019/022584
§ 371 (c)(1),
(2) Date: Sep. 18, 2020

(87) PCT Pub. No.: WO2019/182912
PCT Pub. Date: Sep. 26, 2019

(65) Prior Publication Data
US 2021/0022301 A1   Jan. 28, 2021

Related U.S. Application Data

(60) Provisional application No. 62/647,110, filed on Mar. 23, 2018.

(51) Int. Cl.
| | | |
|---|---|---|
| *A01G 22/55* | (2018.01) | |
| *A01G 2/10* | (2018.01) | |
| *A01G 7/06* | (2006.01) | |
| *A01N 43/38* | (2006.01) | |
| *A01N 43/78* | (2006.01) | |
| *A01N 59/16* | (2006.01) | |

(52) U.S. Cl.
CPC ............. *A01G 22/55* (2018.02); *A01G 2/10* (2018.02); *A01G 7/06* (2013.01); *A01N 43/38* (2013.01); *A01N 43/78* (2013.01); *A01N 59/16* (2013.01)

(58) Field of Classification Search
CPC .......... A01G 22/55; A01G 24/22; A01G 2/10; A01G 22/15
See application file for complete search history.

(56) References Cited

U.S. PATENT DOCUMENTS

| | | |
|---|---|---|
| 6,521,452 B1 | 2/2003 | Abdelrahman |
| 6,543,373 B1 | 4/2003 | Gould et al. |
| 9,078,401 B2 * | 7/2015 | Carroll et al. |

FOREIGN PATENT DOCUMENTS

| | | | | |
|---|---|---|---|---|
| WO | 2009/000402 A1 | 12/2008 | | |
| WO | WO-2009000402 A1 * | 12/2008 | ............... | A01C 1/00 |
| WO | 2010/068521 A1 | 6/2010 | | |
| WO | WO-2015138277 A1 * | 9/2015 | ............. | A01N 59/16 |
| WO | 2017/180490 A1 | 10/2017 | | |
| WO | WO-2017180490 A1 * | 10/2017 | ............... | A01G 2/10 |

OTHER PUBLICATIONS

Salokhe, S. "Production of Disease Free Quality Sugarcane Planting Material Through Micropropagation," International Journal of Innovative Research in Science and Engineering, vol. No. 2, Issue 10, Oct. 2016.*
Pandian et al. "Mechanism of Bactericidal Activity of Silver Nitrate—A Concentration Dependent Bi-Functional Molecule," Brazilian Journal of Microbiology (2010) 41:805-809.*
International Search Report for International Patent Application PCT/US2019/022584 dated May 29, 2019.

* cited by examiner

*Primary Examiner* — Susan McCormick Ewoldt
(74) *Attorney, Agent, or Firm* — BakerHostetler; Toni-Junell Herbert

(57) ABSTRACT

Methods of producing sugar cane transplant units that includes planting sugar cane propagation materials in a non-segregated planting medium to produce a sugar cane where the planting of the sugar cane propagation materials results in an emerged plant density of 25 to 200 plants per square meter; growing the sugar plant to an age of at least 4 months; harvesting the stalks of the sugar cane plant when the stalks have a length of 10 to 100 centimeters; cutting the harvested stalks into stalk segments, wherein the stalk segments are cut to a length of 1 to 5 centimeters; and planting one or more of the stalk segments into a planting container that has a volume from 10 to 200 cubic centimeters.

22 Claims, 6 Drawing Sheets

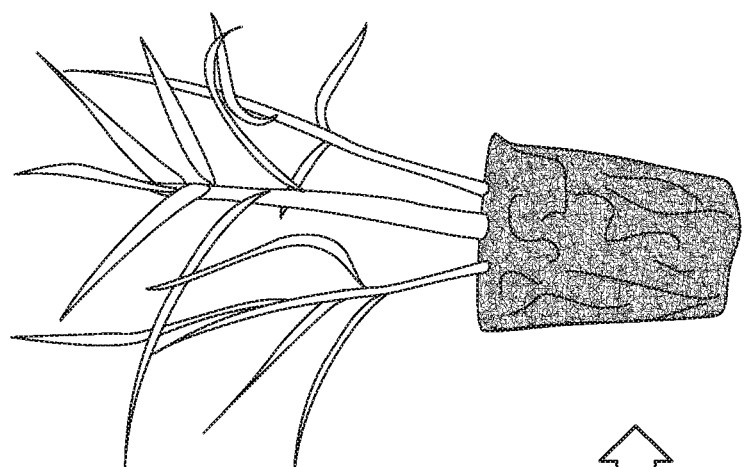
FIG. 4(b)
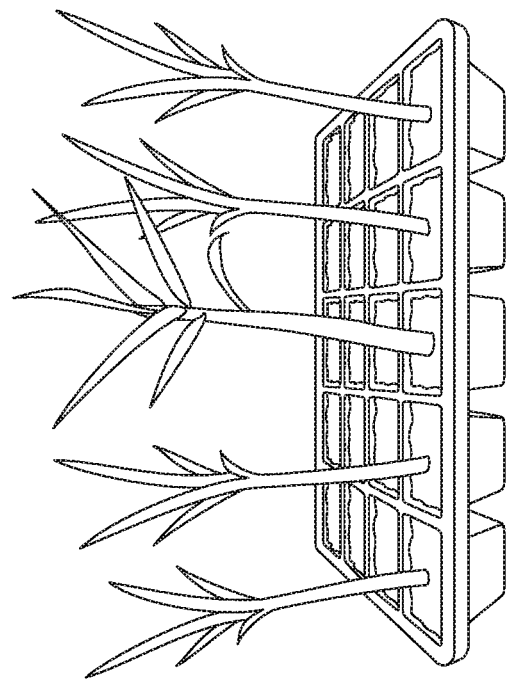
FIG. 4(a)

METHODS OF PRODUCING SUGAR CANE TRANSPLANT UNITS

RELATED APPLICATION INFORMATION

This application is a 371 of International Application No. PCT/US2019/022584, filed 15 Mar. 2019, which claims priority to U.S. Patent Application No. 62/647,110, filed 23 Mar. 2018, the contents of which are incorporated herein by reference herein.

FIGS. 1-4 is a schematic process diagram in accordance with the present technology.

FIG. 4(a) is a schematic representation of a sugar cane transplant units in a multi-cell tray in accordance with the present technology.

FIG. 4(b) is a schematic representation of a sugar cane transplant unit in accordance with the present technology.

DESCRIPTION

Figure 1A:
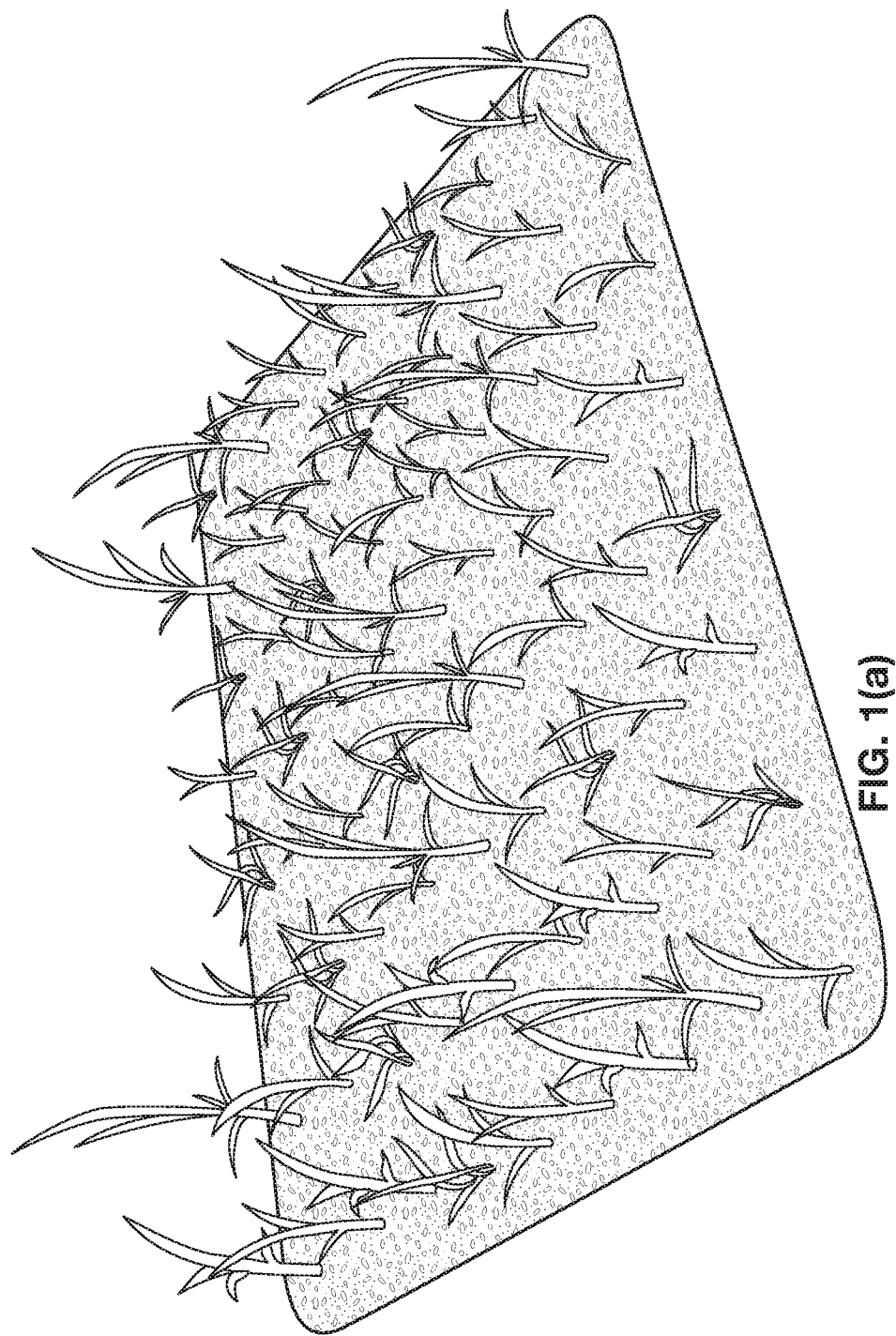
FIG. 1(a) is a schematic representation of a sugar cane plant in a non-segregated planting medium in accordance with the present technology.
Figure 1B:
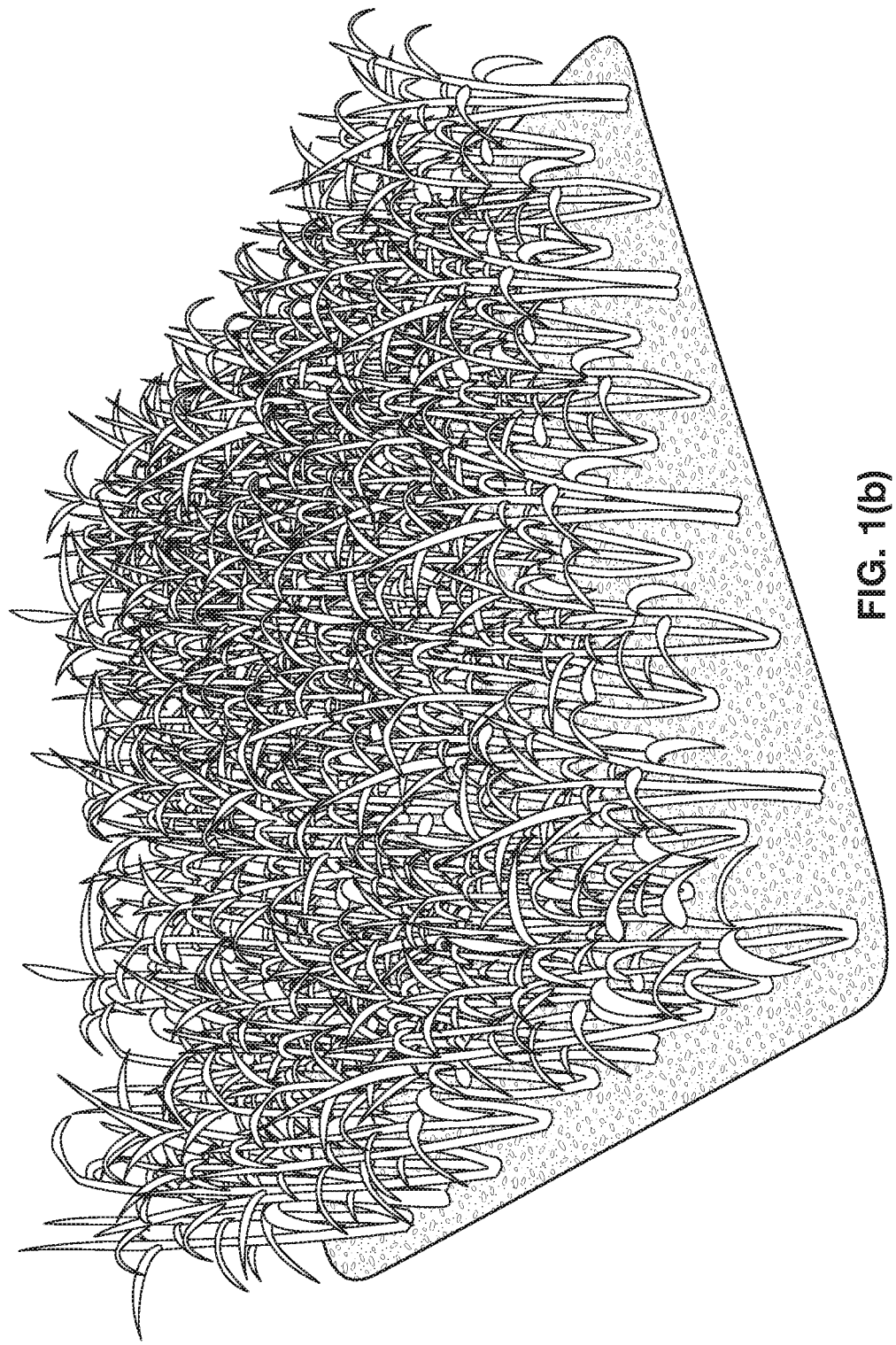
FIG. 1(b) is a schematic representation of a sugar cane plant in a non-segregated planting medium in accordance with the present technology.
Figure 1C:
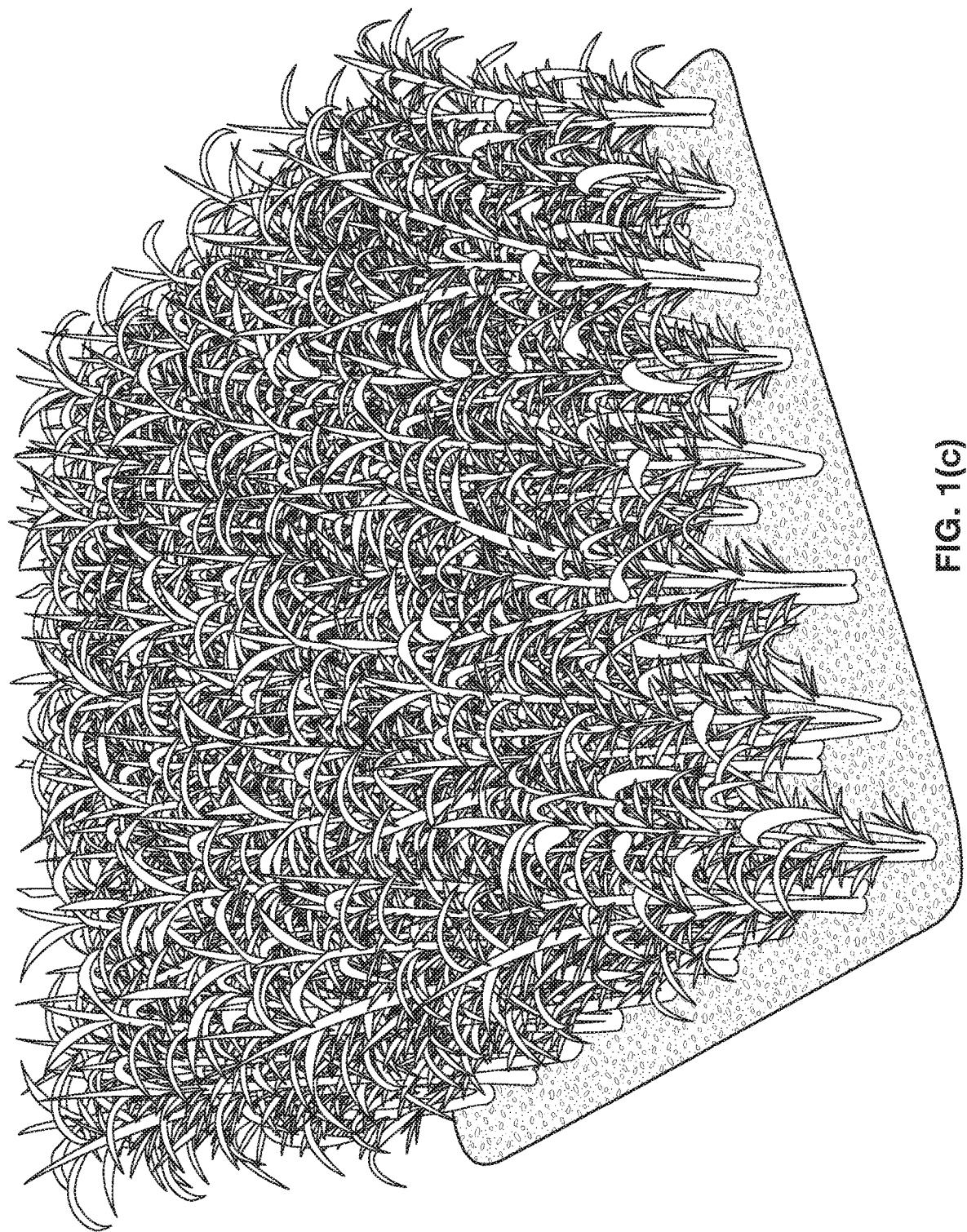
FIG. 1(c) is a schematic representation of a sugar cane plant in a non-segregated planting medium in accordance with the present technology.
Figure 2B:
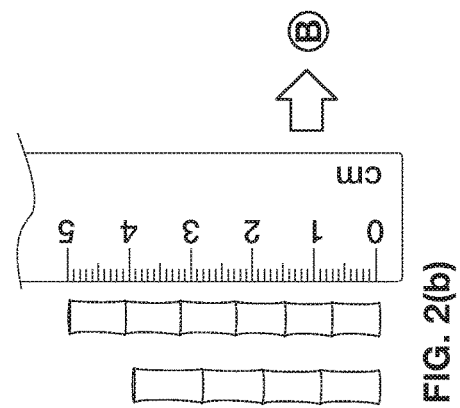
FIG. 2(b) is a schematic representation of a sugar cane stalk segment(s) in accordance with the present technology.
Figure 2A:
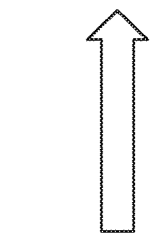
FIG. 2(a) is a schematic representation of a harvested sugar cane stalk in accordance with the present technology.
Figure 2A:
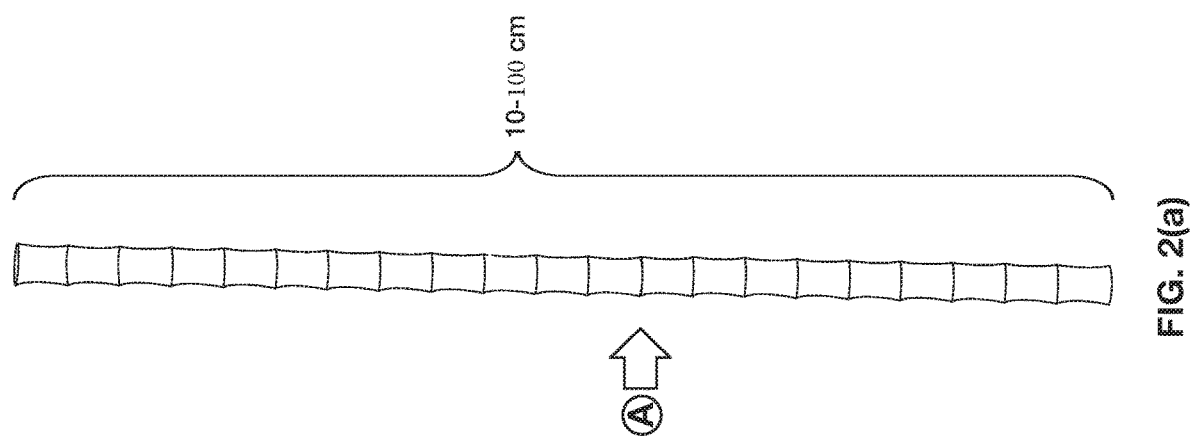
Figure 3A:
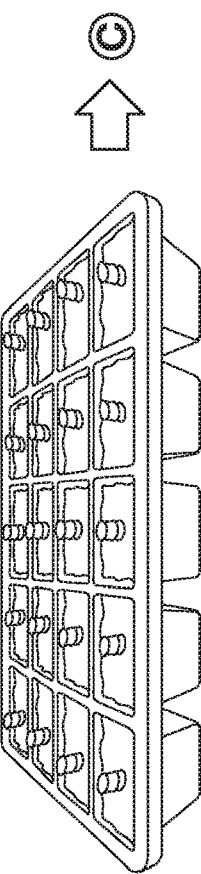
FIG. 3(a) is a schematic representation of sugar cane stalk segment immersed in chemical treatment bath in accordance with the present technology.
Figure 3B:
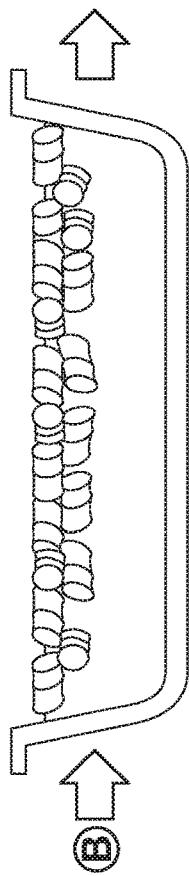
FIG. 3(b) is a schematic representation of a sugar cane stem section placed in a multi-cell tray in accordance with the present technology.

The present application relates generally to the field of plant propagation. In particular, the present invention relates to methods of growing sugar cane plants for transplanting.

The term "stalk" as used herein is the portion the sugar cane plant which includes nodes and internodes.

The term "node" is the area around the sugar cane bud from the leaf scar to the growth ring and is the part of the stalk from which a leaf, branch, or aerial root grows.

The term "internode" is the part of the stalk between two nodes.

The term "plant propagation material" or "propagation material" are plants and parts thereof that are intended for plant cultivation or propagation.

The present invention is directed to methods of producing sugar cane propagation material and sugar cane plants for transplanting, and in particular, for producing a sugar cane transplant unit. In agriculture, transplanting is the technique of moving a plant from one location to another. Generally, transplanting takes the form of starting a plant from plant propagation material under controlled conditions, such as a greenhouse or nursery, then replanting in another growing location, commonly a field.

Transplant productions systems generally include containerized and non-containerized systems. Containerized transplants allow separately grown plants to be transplanted with the roots and soil intact. Containers may include, but are not limited to, biodegradable pots (e.g., peat pots—a pot made of compressed peat), soil blocks (compressed blocks of soil), multiple-cell containers, and plug trays. Such container options are well known in the field of agricultural transplanting.

In one embodiment of the invention, the invention includes a method of producing a sugar cane planting unit. This embodiment provides for a method comprising:
   a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. growing the sugar plant to an age of 4 to 10 months, wherein the sugar cane plant has 1 to 10 stalks and at least one stalk has a linear node density of at least 1 node per 3 centimeters of stalk;
   c. harvesting the stalk(s) of the sugar cane plant when the stalk(s) have a length of 20 to 150 centimeters;
   d. cutting the harvested stalk(s) into stalk segments, wherein the stalk segments are cut to a length of 1 to 5 centimeters; and
   e. planting one or more of the stalk segments into a planting container comprising a planting medium to form a planting unit, wherein said planting container has a volume from 10 to 250 cubic centimeters.

In one embodiment of the invention, the invention includes a method of producing a sugar cane planting unit. This embodiment provides for a method comprising:
   a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. growing the sugar plant to an age of 5 to 8 months, wherein the sugar cane plant has 1 to 10 stalks and at least one stalk has a linear node density of at least 1 node per 3 centimeters of stalk;
   c. harvesting the stalk(s) of the sugar cane plant when the stalk(s) have a length of 20 to 100 centimeters;
   d. cutting the harvested stalk(s) into stalk segments, wherein the stalk segments are cut to a length of 1 to 5 centimeters; and
   e. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:
   a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. growing the sugar plant to an age of 5 to 8 months, wherein the sugar cane plant has 1 to 10 stalks and at least one stalk has a linear node density of at least 1 node per 3 centimeters of stalk;
   c. harvesting the stalk(s) of the sugar cane plant when the stalk(s) have a length of 30 to 90 centimeters;

d. cutting the harvested stalk(s) into stalk segments, wherein the stalk segments are cut to a length of 1 to 3 centimeters; and
e. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:
a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
b. growing the sugar plant to an age of 6 to 7 months, wherein the sugar cane plant has an average of 3 to 7 stalks and at least one stalk has a linear node density of at least 1 node per 3 centimeters of stalk;
c. harvesting the stalk(s) of the sugar cane plant when the stalk(s) have a length of 30 to 90 centimeters;
d. cutting the harvested stalk(s) into stalk segments, wherein the stalk segments are cut to a length of 1 to 4 centimeters; and
e. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:
a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
b. growing the sugar plant to an age of 5 to 8 months, wherein the sugar cane plant has an average of 3 to 7 stalks and at least one stalk has a linear node density of at least 1 node per 2 centimeters of stalk;
c. harvesting the stalk(s) of the sugar cane plant when the stalk(s) have a length of 30 to 100 centimeters;
d. cutting the harvested stalk(s) into stalk segments, wherein the stalk segments are cut to a length of 1 to 2 centimeters; and
e. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:
a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
b. growing the sugar plant to an age of 4 to 8 months, wherein the sugar cane plant has 1 to 10 stalks and at least one stalk has a linear node density of at least 1 node per 3 centimeters of stalk (2-4);

c. harvesting the stalk(s) of the sugar cane plant when the stalk(s) have a length of 20 to 100 centimeters;
d. cutting the harvested stalk(s) into stalk segments, wherein the stalk segments are cut to a length of 1 to 5 centimeters;
e. treating the stalk segments with a crop protection chemical; and
f. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:
a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
b. growing the sugar plant to an age of 4 to 10 months, wherein the sugar cane plant has 1 to 10 stalks and at least one stalk has a linear node density of at least 1 node per 3 centimeters of stalk;
c. harvesting the stalk(s) of the sugar cane plant when the stalk(s) have a length of 20 to 100 centimeters;
d. cutting the harvested stalk(s) into stalk segments, wherein the stalk segments are cut to a length of 1 to 5 centimeters;
e. treating the stalk segments with water, wherein the water temperature is 45° C. to 55° C.
f. treating the stalk segments with a fungicide; and
g. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:
a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
b. growing the sugar plant to an age of 4 to 10 months, wherein the sugar cane plant has 1 to 10 stalks and at least one stalk has a linear node density of at least 1 node per 3 centimeters of stalk;
c. harvesting the stalk(s) of the sugar cane plant when the stalk(s) have a length of 20 to 100 centimeters;
d. cutting the harvested stalk(s) into stalk segments, wherein the stalk segments are cut to a length of 1 to 5 centimeters;
e. treating the stalk segments with water, wherein the water temperature is 45° C. to 55° C.
f. treating the stalk segments with a fungicide and plant growth hormone; and
g. planting one or more of the stalk segments into a planting container comprising a planting medium to form a planting unit, wherein said planting container has a volume from 10 to 200 cubic centimeters.

In one embodiment of the invention, the invention includes a method of producing a sugar cane planting unit. This embodiment provides for a method comprising:

a. planting sugar cane propagation materials in a non-segregated planting medium to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
b. growing the sugar plant to an age of 4 to 10 months, wherein the sugar cane plant has 1 to 10 stalks and at least one stalk has a linear node density of at least 1 node per 3 centimeters of stalk;
c. harvesting the stalk(s) of the sugar cane plant when the stalk(s) have a length of 20 to 100 centimeters;
d. cutting the harvested stalk(s) into stalk segments, wherein the stalk segments are cut to a length of 1 to 5 centimeters;
e. treating the stalk segments with water, wherein the water temperature is 45° C. to 55° C.
f. treating the stalk segments with a fungicide, an insecticide, a nematicide and plant growth hormone; and
g. planting one or more of the stalk segments into a planting container comprising a planting medium to form a planting unit, wherein said planting container has a volume from 10 to 200 cubic centimeters.

Planting and Growing

The present technology provides for planting and growing sugar plants. In one embodiment, the present technology includes two planting steps, a first planting to grow a sugar cane plant, and a second planting to create a planting unit.

The first planting step includes planting multiple sugar cane propagation materials into a non-segregated planting medium. A non-segregated planting medium is herein understood to mean a planting medium comprising multiple plants or seeds are not separated by artificial barriers. Non-segregated planting is most commonly recognized by those of skill in the art as a common field or garden, for example. Other examples may include small to large undivided planters where multiple plants are being produced within the same planter.

The plant propagation material for the first planting step is generally selected from a sugar cane plant produced from tissue culture or a sugar cane billet, but may also include a sugar cane plantlet. Such sugar cane propagation material is well-known by those of skill in the art. In one preferred embodiment, the sugar cane plant propagation material is a billet with a single node. In another preferred embodiment, the sugar cane plant propagation material is a plant produced from tissue culture. A plant produced from tissue culture is commonly produced through micro-propagation. Micro-propagation generally includes steps of establishment, multiplication, rooting, and transfer from culture.

The immense increase in planting density of present technology, as compared with sugar cane production practices known in the art, allows for control over the size of the sugar cane plant—in both length and diameter. The high plant density generally results in a sugar cane plant that appears as miniature sugar cane plant as compared to a sugar cane plant without such density. In one embodiment the planting of the sugar cane propagation materials results in an emerged plant density of 25 to 200 plants per square meter. In another embodiment the planting of the sugar cane propagation materials results in an emerged plant density of 50 to 150 plants per square meter. In another embodiment the planting of the sugar cane propagation materials results in an emerged plant density of 50 to 125 plants per square meter. In another embodiment the planting of the sugar cane propagation materials results in an emerged plant density of 40 to 100 plants per square meter.

In one embodiment, the stalks per plant, known commonly as tillers, is between 1-10. Based on the emerged plant density disclosed herein, the tillering density of the sugar cane is between 25 and 2000 tillers per square meter. In one embodiment the tillering density is between 100 and 2000 tiller per square meter. In another embodiment the tillering density is between 100 and 1000 tiller per square meter. In another embodiment the tillering density is between 100 and 500 tiller per square meter. In another embodiment the tillering density is between 100 and 250 tillers per square meter. In another embodiment the tillering density is between 100 and 200 tillers per square meter. In another embodiment the tillering density is between 100 and 150 tillers per square meter. In another embodiment the tillering density is between 120 and 150 tillers per square meter.

In one embodiment the sugar cane plants are allowed to grow in the non-segregated growth medium for at least 4 months. In another embodiment the sugar cane plants are grown to age of between 4 to 24 months. In another embodiment the sugar cane plants are grown to age of between 4 to 18 months.

The second planting step includes planting a sugar cane propagation material into a planting container to form a transplant unit. The planting container is generally of volume between 10 and 200 cubic centimeters. In another embodiment, the second planting container is between 10 and 100 cubic centimeters. In another embodiment, the second planting container is between 50 and 200 cubic centimeters. In another embodiment, the second planting container is between 50 and 150 cubic centimeters. In another embodiment, the second planting container is between 75 and 125 cubic centimeters. In another embodiment, the second planting container is between 95 and 105 cubic centimeters. In a preferred embodiment, the container is a multi-cell container which has 25 or more cells.

The term "planting medium", "growing medium", or "growth medium" is the material a plant propagation material is sown to grow a plant. Planting mediums are well known in the art and the composition of such medium are well known and commonly modified or adapted to the grower's needs and local environment. The most common and well known growing medium is common soil, which varies by geographic region and may, or may not, be modified dependent on need. There are many different ingredients that can be used to make a growing medium; different parts of the world have developed media based on local availability of various raw materials. Such materials may include both inorganic materials (e.g. rockwool, perlite) and organic materials (such as peat, bark, turf and other organic substrates). The requirements and/or functionality of a growing medium general provide anchorage for the plant; provide adequate air spaces for root respiration; hold sufficient available water; hold sufficient available nutrients; is free of plant pathogens, pests and weeds; and is safe when handled by people. Growing media is generally physically and chemically stable from the time of production until the time of use. The bulk density of the ingredients used may also important because this affects transport costs, a major part of the total cost of production and delivery to the end customer.

The growing media may also be treated with crop protection chemicals, for example, with fungicides, insecticides and nematicides in order to provide plant protection against diseases, insects, fungus and nematodes.

Harvesting and Dehusking

Harvesting of the stalks can be performed by any known method and generally includes at least separating the stalk from the root system. The leaves of the sugar cane plant may also be removed, a technique called dehusking.

The harvesting step of the present invention occurs after the plants have reached an age of between 4 and 18 months and have reached a stalk height of 10 to 150 centimeters.

At the time of harvest, the stalk or stalks preferably have an average linear node density of at least 1 node per 3 centimeters of stalk.

Separation of the stalk from the root system is generally performed by cutting via shearing (e.g., with a knife) or sawing, which can be performed either manually or mechanically.

In another embodiment of the present technology, the harvesting step is performed manually using a hand-held cutting device.

Cutting

Cutting the harvested stalks into stalk segments can be performed by any known method. Such cutting can be performed manually by hand, or with the use of machine.

The cutting of stalks into stalk segments of the preset technology is directed to cutting the stalks into stalk segment sizes of 1 to 5 cm in length and where the stalk segment contains at least one node.

Treating

The treating step includes, but is not limited to, a hot water treatment, application of plant nutrients, application of pesticides, application of plant growth regulators, or application of other suitable agricultural chemistries.

In one embodiment, the treating step includes a hot water treatment that contains a concentration of one or more plant growth regulators and one or more fungicides, insecticides, safeners, and/or nematicides. In this embodiment, the treatment step is one or more plant growth regulators and one or more fungicides and optionally one or more insecticides are added to an application system including a hot water bath and the stalk segment are treated with the named compounds. The concentration of a given plant growth regulator, fungicide, insecticide, safener, or nematicide are readily determined by those of skill in the art. Hot water treatments are known, particularly in horticulture, to kill bacterial disease causing organism on or within plant propagation materials. Known hot water treatment temperatures are generally 45° C. to 55° C. and require a soak time of 15 to 30 minutes. In sugar cane, hot water treatment is commonly suggested to break potential bud dormancy by immersing sugar cane billets in 50° C. for 2 hours. In the present invention, however, the hot water treatment step can be performed in 1 to 10 minutes, and preferably in 2 to 3 minutes.

When plant growth regulators are included in the hot water treatment, a concentration will be determined. A person of skill in art can determine and apply an appropriate concentration based on the selection of plant growth regulator applied. As a general guide, the following concentrations are examples:

TABLE 1

| | Plant Growth Regulator Concentrations (grams/liter) | |
|---|---|---|
| Range | Lower Limit | Upper Limit |
| 1 | 0.01 | 100 |
| 2 | 0.025 | 90 |
| 3 | 0.05 | 80 |
| 4 | 0.075 | 70 |
| 5 | 0.09 | 60 |
| 6 | 0.1 | 50 |
| 7 | 0.1 | 40 |
| 8 | 0.25 | 20 |
| 9 | 0.5 | 10 |
| 10 | 0.5 | 5 |

Plant growth regulators are any substances or mixtures of substances intended to alter the germination, growth, maturation, or development of plants or their produce. Plant growth regulators may be classified into subcategories including, but not limited to antiauxins (clofibric acid, 2,3,5-tri-iodobenzoic acid), auxins (4-CPA, 2,4-D, 2,4-DB, 2,4-DEP, dichlorprop, fenoprop, IAA, IBA, naphthaleneacetamide, α-naphthaleneacetic acid, 1-naphthol, naphthoxyacetic acid, potassium naphthenate, sodium naphthenate, 2,4,5-T), cytokinins (2iP, benzyladenine, kinetin, zeatin), defoliants (calcium cyanamide, dimethipin, endothal, ethephon, merphos, metoxuron, pentachlorophenol, thidiazuron, tribufos), ethylene inhibitors (aviglycine, 1-methylcyclopropene), ethylene releasers (ACC, etacelasil, ethephon, glyoxime), gibberellins (gibberellic acid, gibberellins, including non-cyclopropene compounds that show gibberellin-like activity, such as, for example, helminthosporic acid, phaseolic acid, kaurenoic acid, and steviol), growth inhibitors (abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham 2,3,5-tri-iodobenzoic acid), morphactins (chlorfluren, chlorflurenol, dichlorflurenol, flurenol), growth retardants/modifiers (chlormequat, daminozide, flurprimidol, mefluidide, paclobutrazol, cyproconazole, tetcyclacis, uniconazole, ancymidol, trinexapac-ethyl, and progexadione-CA), growth stimulators (brassinolide, forchlorfenuron, hymexazol, 2-amino-6-oxypurine derivatives, as described below, indolinone derivates, as described below, 3,4-disubstituted maleimide derivatives, as described below, and fused azepinone derivatives, as described below). The term additionally includes other active ingredients such as benzofluor, buminafos, carvone, ciobutide, clofencet, cloxyfonac, cyclanilide, cycloheximide, epocholeone, ethychlozate, ethylene, fenridazon, heptopargil, holosulf, inabenfide, karetazan, lead arsenate, methasulfocarb, prohexadione, pydanon, sintofen, triapenthenol, and trinexapac. Preferred plant growth regulators include growth retardants, the class of gibberellins, including gibberellic acid, growth inhibitors, and growth stimulators.

In another embodiment, the plant growth regulator is a hormone selected from cytokinins and auxins. Preferred cytokinins may be selected from the group consisting of kinetin, zeatin, 6-benzylaminopurine, diphenyl urea, and thidiazuron. Preferred auxins may be selected from the group consisting of indole-3-actetic acid (IAA), 4-chloroindole-3-acetic acid (4-CI-IAA), 2-phenylacetic acid (PAA), and indole-3-butyric acid (IBA).

While the preferred embodiment of applying agricultural chemicals such as plant growth regulators and fungicides is a hot water treatment, such description is not intended to, and does not, limit the scope the present invention to such treatment type. Other treatment method are intended to be encompasses in such treatment step. These treating methods include, by way of example and not by limitation, water treatment (varying temperatures), dressing, spraying, coating and the already described soaking methods. Conventional treating techniques and machines can be used, such as fluidized beds, roller mills, rotostatic seed treaters, drum coaters, cascade and spouted beds. The techniques of propagation material treatment applications are well known to those skilled in the art, and they may be used readily in the context of the present invention. Needless to say, the method of application of the inventive compositions to the propagation material may be varied and the invention is intended to include any technique that is to be used.

Crop Protection Chemicals

Additional crop protection chemicals may be applied to propagation material, to the planting mediums of either of the planting steps describe herein, or to the plant itself.

Crop protection chemicals are known in the art and include, for example and among others, insecticides, nematicides, fungicides, plant growth regulators, acaricides, microorganisms, bactericides and plant activators. Lists of such agricultural chemicals can be found at Alan Wood's website, <www.alanwood.net/pesticides>, and/or in Tomlin, CDS, ed. (2009), and/or *The Pesticide Manual*, 15$^{th}$ Edition, British Crop Protection Counsel, (ISBN: 9781901396188).

The term "pesticide" as used herein is intended to cover compounds active against pests which are intended to repel, kill, or control any species designated a pest including weeds, insects, rodents, fungi, bacteria, or other organisms.

Examples of pesticides include those selected from, for example and not for limitation, insecticides, acaricides, bactericides, fungicides, nematicides and molluscicides.

Suitable additions of fungicidally active ingredients are, for example and not for limitation, representatives of the following classes of active ingredients: strobilurins, triazoles, ortho-cyclopropyl-carboxanilide derivatives, phenylpyrroles, and other systemic fungicides. In one embodiment the crop protection chemical is a strobilurin fungicide such as azoxystrobin, trifloxystrobin, pyraclostrobin, picoxystrobin or fluoxastrobin. In another embodiment the crop protection chemical is a fungicide such as difenoconazole, fludioxonil, thiabendazole, tebuconazole, metalaxyl, mefenoxam, myclobutanil, sedaxane, boscalid, bixafen, or penflufen.

Suitable additions of insecticidally, acaricidally, nematicidally, or molluscicidally active ingredients are, for example and not for limitation, representatives of the following classes of active ingredients: organophosphorus compounds, nitrophenols and derivatives, formamidines, triazine derivatives, nitroenamine derivatives, nitro- and cyanoguanidine derivatives, ureas, benzoylureas, carbamates, pyrethroids, chlorinated hydrocarbons and *Bacillus thuringiensis* products. In one embodiment the crop protection chemical is a neonicotinoid insecticide such as thiamethoxam, clothianidin, imidacloprid or thiacloprid. In another embodiment the crop protection chemical is an insecticide such as abamectin, acetamiprid, thiodicarb, nitenpyram, dinotefuran, fipronil, lufenuron, pyriproxyfen, fluoxofenim, chlorantraniliprole, cyantraniliprole, beta-cyfluthrin, lambda-cyhalothrin, fenoxycarb, diafenthiuron, pymetrozine, diazinon, disulphate, profenofos, furathiocarb, cyromazine, cypermethrin, tau-fluvalinate, tefluthrin or *Bacillus thuringiensis* products.

Agricultural chemicals may also include herbicidal safeners. Suitable safeners can be benoxacor, cloquintocet-mexyl, cyometrinil, cyprosulfamide, dichlormid, dicyclonon, diethiolate, fenchlorazole-ethyl, fenclorim, flurazole, fluxofenim, furilazole and the corresponding R isomer, isoxadifen-ethyl, jiecaowan, jiecaoxi, mefenpyr-diethyl, mephenate, naphthalic anhydride, oxabetrinil, TI-35, and 2-methoxy-N-[[4-[[(methylamino)carbonyl]amino]phenyl] sulfonyl]-benzamide.

The safeners of the compound of formula I may also be in the form of esters or salts, as mentioned e.g. in The e-Pesticide Manual, version 5.2 (BCPC), 2011. The reference to cloquintocet-mexyl also applies to cloquintocet, and the reference to fenchlorazole-ethyl also applies to fenchlorazole, etc.

Example of microorganisms include those, such as, mycorrhiza, *rhizobia, bacillus* spp., *trichoderma* spp., and *pasteuria* spp.

Suitable bactericides include, but are not limited to, amicarthiazol, bismerthiazol, bronopol, cellocidin, chloramphenicol, copper ammonium carbonate, copper hydroxide, copper octanoate, copper oxychloride, copper oxides, copper sulfate, copper salts of fatty acids, cresol, dichlorophen, dipyrithione, dodicin, ethylicin, fenaminosulf, formaldehyde, hexachlorophene, hydrated lime, hydrargaphen, 8-hydroxyquinoline sulfate, kasugamycin, nitrapyrin, octhilinone, oxolinic acid, oxytetracycline, phenazine oxide, probenazole, saijunmao, saisentong, silver nitrate, calcium oxide, streptomycin, tecloftalam, thiodiazole-copper, thiomersal, xinjunan, and zinc thiazole. A particularly preferred bactericide of the present invention is silver nitrate and calcium oxide.

The invention claimed is:

1. A method of producing a sugar cane planting unit, the method comprising:
   a. planting multiple sugar cane propagation materials in a field or garden to produce a sugar cane plant, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. after step (a), growing the sugar plant to an age of 4 to 10 months, wherein the sugar cane plant has 1 to 10 stalks and at least one stalk has a linear node density of at least 1 node per 3 centimeters of stalk;
   c. after step (b), harvesting the stalk(s) of the sugar cane plant when the stalk(s) have a length of 20 to 150 centimeters;
   d. after step (c), cutting the harvested stalk(s) into stalk segments, wherein the stalk segments are cut to a length of 1 to 5 centimeters; and
   e. after step (d), planting one or more of the stalk segments into a planting container comprising a planting medium to form a planting unit, wherein said planting container has a volume from 10 to 200 cubic centimeters.

2. The method of claim 1, further comprising transplanting the planting unit into a field.

3. The method of claim 1, further comprising: prior to step (e), treating the stalk segments with a crop protection chemical.

4. The method of claim 1, further comprising: prior to step (e), treating the stalk segments with water, wherein the water temperature is 45° C. to 55° C.

5. The method of claim 3, wherein the crop protection chemical is a plant growth regulator.

6. The method of claim 3, wherein the crop protection chemical is a plant hormone.

7. The method of claim 6, wherein the plant hormone is indole-3-butyric acid.

8. The method of claim 5, further comprising treating the stalk segments with a bactericide.

9. The method of claim 8, wherein the bactericide is selected from amicarthiazol, bismerthiazol, bronopol, cellocidin, chloramphenicol, copper ammonium carbonate, copper hydroxide, copper octanoate, copper oxychloride, copper oxides, copper sulfate, copper salts of fatty acids, cresol, dichlorophen, dipyrithione, dodicin, ethylicin, fenaminosulf, formaldehyde, hexachlorophene, hydrated lime, hydrargaphen, 8-hydroxyquinoline sulfate, kasugamycin, nitrapyrin, octhilinone, oxolinic acid, oxytetracycline, phenazine oxide, probenazole, saijunmao, saisentong, silver nitrate, calcium oxide, streptomycin, tecloftalam, thiodiazole-copper, thiomersal, xinjunan, and zinc thiazole.

10. The method of claim 8, wherein the bactericide is silver nitrate.

11. The method of claim 6, wherein the plant growth regulator is indole-3-butyric acid and the indole-3-butyric acid concentration is 0.5 to 10 g/L.

12. The method of claim 11, wherein the plant growth regulator concentration is 0.8 to 1.2 g/L.

13. The method of claim 10, wherein the treating the stalk segments with silver nitrate comprises immersing the stalk segment in a silver nitrate solution having a silver nitrate concentration of 0.01 to 10 g/L.

14. The method of claim 3, wherein the crop protection chemical is a pesticide.

15. The method of claim 14, wherein the treating the stalk segments with a pesticide comprises immersing the stalk segment in a fungicide solution having a fungicide concentration of 0.01 to 10 g/L.

16. The method of claim 1, wherein the planting the one or more stalk segments comprises planting a single stalk segment into the planting container.

17. The method of claim 1, wherein the sugar cane propagation material is a sugar cane billet; and wherein the sugar cane billet consists of a single node.

18. The method of claim 1, wherein the sugar cane propagation material is a plant produced from tissue culture.

19. The method of claim 15, wherein the fungicide is thiabendazole and the fungicide concentration is 0.1 to 3 g/L.

20. A method of producing a sugar cane planting unit, the method comprising:
   a. planting multiple sugar cane propagation materials in a non-segregated planting medium, wherein said non-segregated planting medium is not a planting container having a volume from 10 to 200 cubic centimeters, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. after step (a), growing the sugar plant to an age of 4 to 10 months, wherein the sugar cane plant has 1 to 10 stalks and at least one stalk has a linear node density of at least 1 node per 3 centimeters of stalk;
   c. after step (b), harvesting the stalk(s) of the sugar cane plant when the stalk(s) have a length of 20 to 150 centimeters;
   d. after step (c), cutting the harvested stalk(s) into stalk segments, wherein the stalk segments are cut to a length of 1 to 5 centimeters; and
   e. after step (d), planting one or more of the stalk segments into a planting container comprising a planting medium to form a planting unit, wherein said planting container has a volume from 10 to 200 cubic centimeters.

21. A method of producing a sugar cane planting unit, the method comprising:
   a. planting multiple sugar cane propagation materials in a non-segregated planting medium is a planter, wherein said planter is at least a small undivided planter, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. after step (a), growing the sugar plant to an age of 4 to 10 months, wherein the sugar cane plant has 1 to 10 stalks and at least one stalk has a linear node density of at least 1 node per 3 centimeters of stalk;
   c. after step (b), harvesting the stalk(s) of the sugar cane plant when the stalk(s) have a length of 20 to 150 centimeters;
   d. after step (c), cutting the harvested stalk(s) into stalk segments, wherein the stalk segments are cut to a length of 1 to 5 centimeters; and
   e. after step (d), planting one or more of the stalk segments into a planting container comprising a planting medium to form a planting unit, wherein said planting container has a volume from 10 to 200 cubic centimeters.

22. A method of producing a sugar cane planting unit, the method comprising:
   a. planting at least 5 sugar cane propagation materials in a non-segregated planting medium, wherein the sugar cane propagation material is a plant produced from tissue culture, a sugar cane billet, or a sugar cane plantlet, and where the planting of the sugar cane propagation materials results in an emerged plant density of 25 to 200 plants per square meter;
   b. after step (a), growing the sugar plant to an age of 4 to 10 months, wherein the sugar cane plant has 1 to 10 stalks and at least one stalk has a linear node density of at least 1 node per 3 centimeters of stalk;
   c. after step (b), harvesting the stalk(s) of the sugar cane plant when the stalk(s) have a length of 20 to 150 centimeters;
   d. after step (c), cutting the harvested stalk(s) into stalk segments, wherein the stalk segments are cut to a length of 1 to 5 centimeters; and
   e. after step (d), planting one or more of the stalk segments into a planting container comprising a planting medium to form a planting unit, wherein said planting container has a volume from 10 to 200 cubic centimeters.

* * * * *